United States Patent
Hammerschmidt

(10) Patent No.: US 7,673,505 B2
(45) Date of Patent: Mar. 9, 2010

(54) TIRE FOOTPRINT DETERMINATION APPARATUSES, SYSTEMS AND METHODS

(75) Inventor: Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 19 days.

(21) Appl. No.: 12/184,296

(22) Filed: Aug. 1, 2008

(65) Prior Publication Data

US 2010/0024538 A1 Feb. 4, 2010

(51) Int. Cl.
*B60C 23/02* (2006.01)
(52) U.S. Cl. ............... 73/146.5; 702/41; 702/148
(58) Field of Classification Search ............... None
See application file for complete search history.

(56) References Cited

U.S. PATENT DOCUMENTS

| | | | |
|---|---|---|---|
| 2007/0240501 A1* | 10/2007 | Mancosu et al. | 73/146 |
| 2007/0255510 A1* | 11/2007 | Mancosu et al. | 702/34 |
| 2009/0012740 A1* | 1/2009 | Hain et al. | 702/148 |
| 2009/0234591 A1* | 9/2009 | Savaresi et al. | 702/41 |

* cited by examiner

*Primary Examiner*—Andre J Allen
(74) *Attorney, Agent, or Firm*—Patterson, thuente, Skaar & Christensen, P.A.

(57) ABSTRACT

In one embodiment, a method comprises sampling a sensor during rotation, determining a percentage of samples within a target range, and calculating a circumferential portion of the rotation associated with the percentage of samples. In other embodiments, additional systems and methods and disclosed.

25 Claims, 6 Drawing Sheets

TIRE FOOTPRINT DETERMINATION APPARATUSES, SYSTEMS AND METHODS

BACKGROUND OF THE INVENTION

The place where a vehicle tire directly interfaces with a road or other driving surface is often referred to as the contact area. The size, shape, and related dynamics of the contact area, or "footprint," of each tire on a vehicle can provide important information about vehicle size and load, tire pressure and characteristics, road surface, operating and driving conditions, and other factors. Accordingly, detecting and monitoring the footprint during vehicle operation can provide valuable information for improving vehicle handling and safety.

In the past, tire footprints have been measured quasi-statically using pressure sensitive devices positioned between the tire and the driving surface. These devices use capacitive or photo/print techniques in order to image the contact area. Specially prepared transparent inserts in the road in conjunction with optical detection methods have also been used. While successful at identifying the footprint, practical use of these methods is limited because they cannot measure the footprint and determine related contact information during real driving conditions.

Other methods that use multiple sensors inside the tire for continuous measurement of the footprint have also been proposed. A potential disadvantage with such methods as they currently exist is a more complicated implementation of these sensors and the need for advanced data analysis due to high bandwidth and data rates. Further, sensors in the tire(s) need an independent power supply, typically a battery, which limits the energy available for data processing and transmission of data out of the tire by radio frequency (RF) communications. Additionally, the overall weight of these sensors, as well as their power supplies and other system components, is often required to be below five grams in order to fulfill original equipment manufacturer (OEM) requirements, which can limit system design.

SUMMARY OF THE INVENTION

In one embodiment, a method comprises sampling a sensor during rotation, determining a percentage of samples within a target range, and calculating a circumferential portion of the rotation associated with the percentage of samples.

In another embodiment, a method comprises sampling an acceleration sensor at a plurality of speeds during a plurality of rotations of a tire, determining a percentage of samples that converges in a predetermined tolerance band, and calculating a circumferential portion of the tire associated with the percentage of samples, wherein the circumferential portion is related to a footprint dimension of the tire.

In yet another embodiment, a system comprises an acceleration sensor configured to sense samples in a first acceleration force range and a second acceleration force range, and circuitry configured to determine a percentage of the samples within the first acceleration force range.

BRIEF DESCRIPTION OF THE DRAWINGS

The invention may be more completely understood from the following detailed description of various embodiments in connection with the accompanying drawings, in which.

Figure 1:
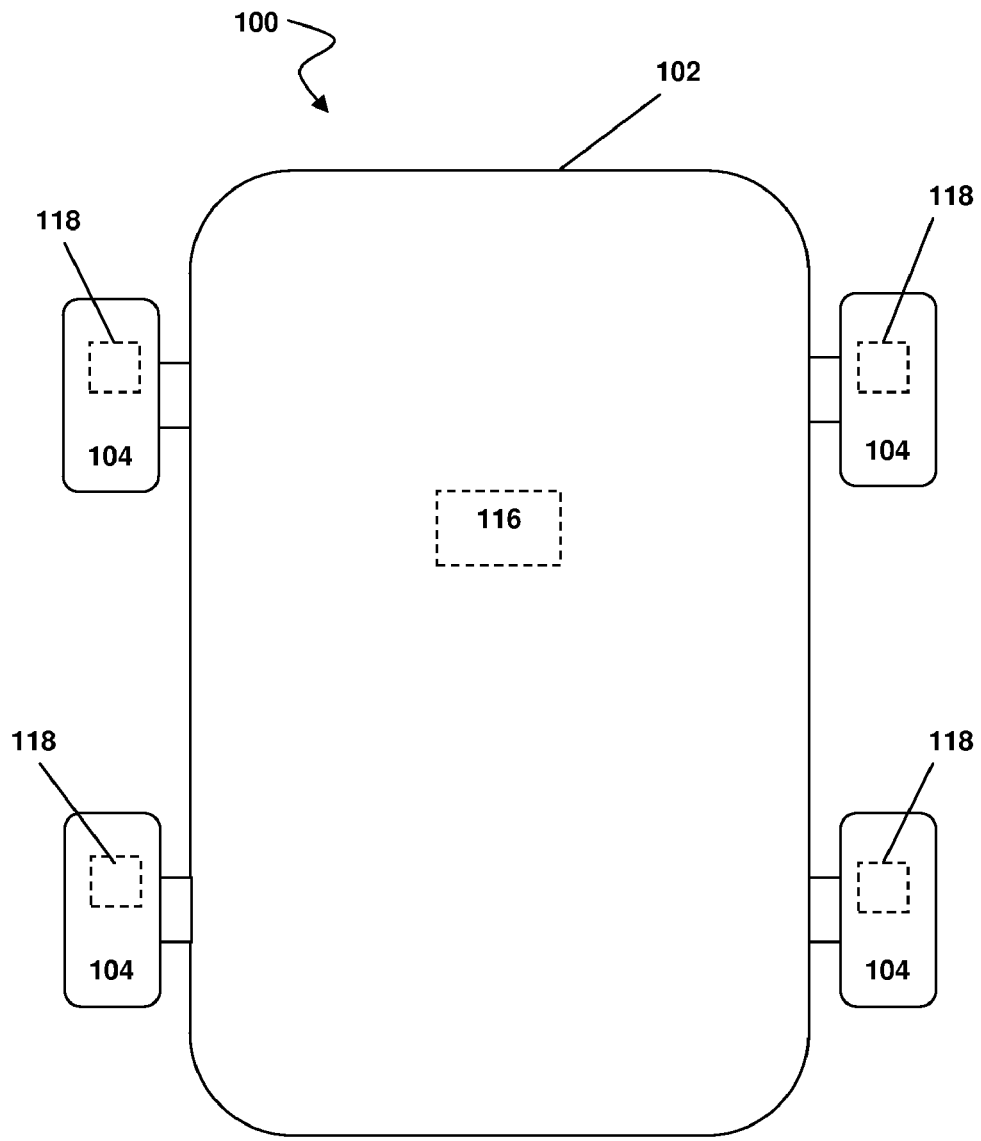
FIG. 1 is a block diagram of a tire pressure monitoring system (TPMS) according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

The invention is related to TPMS apparatuses, systems and methods. In various embodiments, the invention relates to TPMS that comprise sensors and circuitry adapted to identify a footprint area of a tire. The invention can be more readily understood by reference to FIGS. 1-11 and the following description. While the invention is not necessarily limited to the specifically depicted application(s), the invention will be better appreciated using a discussion of exemplary embodiments in specific contexts.

Referring to FIG. 1, an intelligent tire system (ITS) 100 according to an embodiment of the invention is depicted. ITS 100 is implemented in a vehicle 102, which can comprise an automobile, SUV, truck, semi-truck, bus, motorcycle, or other vehicle having two, four, or some other number of wheels and tires. As depicted and described in the example that follows, vehicle 102 has four wheels 104 and is but one example of a suitable vehicle for implementing various embodiments of ITS 100.

Figure 2:
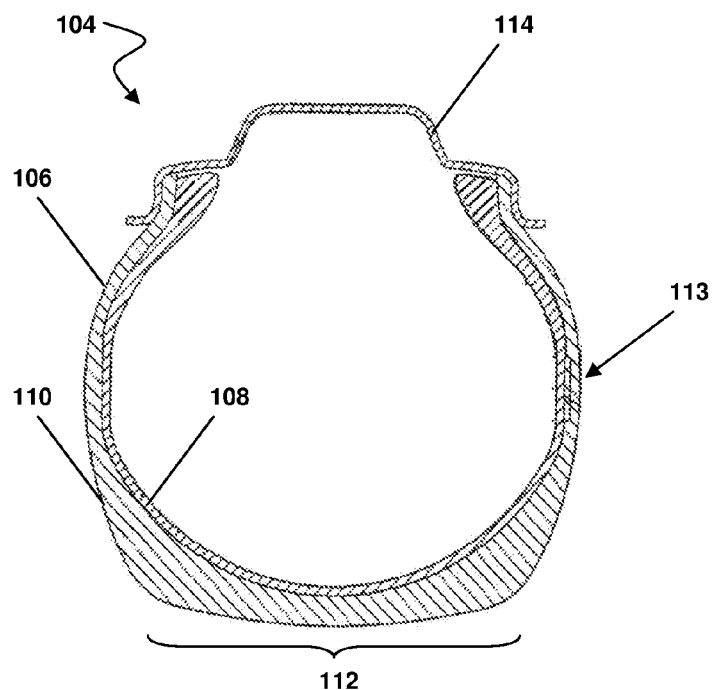
FIG. 2 is a diagram of a tire according to an embodiment.

Referring to FIG. 2, each wheel 104 typically comprises a tire 106 including an inner liner 108 that lines the inside of tire 106, multiple ply layers (not shown) over the inner liner, and one or more steel belts over the ply layers (not shown). A cushion layer and a base layer (not shown) are situated over the steel belts and a cap layer 110, also referred to as the tread layer, is situated on the outside of tire 106 over the base layer. The entire tire structure 106 is mounted on a rim 114, forming wheel 104, and coupled to an axle of vehicle 102.

A tread portion 112 interacts with the road surface to provide traction, wherein the part of the tread portion 112 in actual physical contact with the road surface is referred to as the contact area or "footprint" of tire 106. The footprint of each tire 106 can vary according to a weight or load of vehicle 102, physical movement of vehicle 102, and other variables.

Referring again to FIG. 1, ITS 100 comprises a receiver unit 116 and a plurality of wheel modules 118. In one embodiment, one wheel module 118 is associated with each wheel 104 of vehicle 102. In other embodiments, ITS 100 includes fewer wheel modules 118 than wheels 104. Each wheel module 118 is mounted or otherwise affixed to a rim 114 (refer to FIG. 2) within a tire 106 of each wheel 104 in one embodiment. In other embodiments, wheel modules 118 can be mounted to an interior of tread portion 112 or sidewall portion 113 of tire 106 or some other area of wheel 104 or rim 114 (refer also to FIG. 2). Receiver unit 116 can be mounted within, on or to vehicle 102, in various locations and positions in various embodiments, although receiver unit 116 is typically positioned to best send and receive signals with ITS 100 and other relevant components and systems in vehicle 102.

In one embodiment, each wheel module 118 transmits local information, such as tire pressure and other data, to receiver unit 116. In other embodiments, receiver unit 116 can also transmit information to each wheel module 118. While these communications between wheel modules 118 and receiver unit 116 can be partially or entirely wired, wireless radio frequency (RF) transmissions are used in one embodiment.

Figure 3:
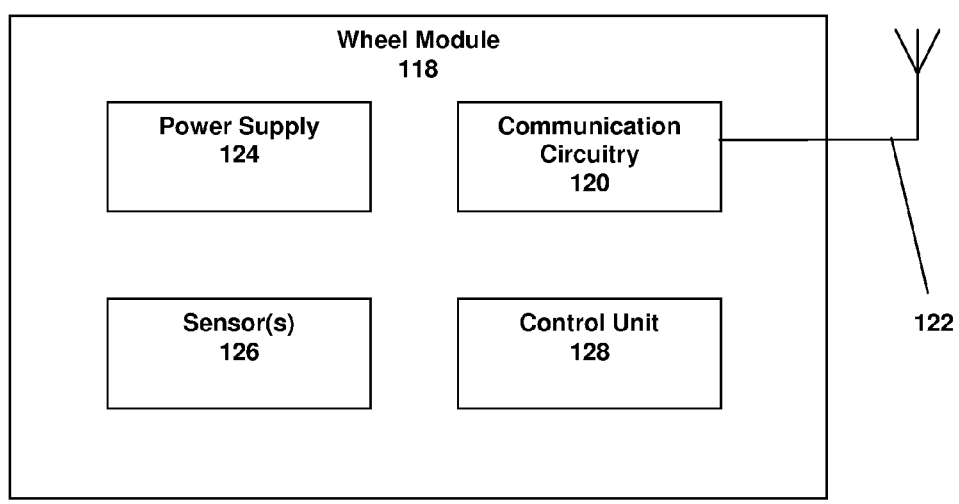
FIG. 3 is a block diagram of a wheel module according to an embodiment.

One embodiment of wheel module 118 thus comprises communication circuitry 120, such as RF communication circuitry in one embodiment, and an antenna 122, as depicted in the block diagram of FIG. 3. Communication circuitry 120, as well as wheel module 118 as a whole, is powered by a power supply 124. In one embodiment, power supply 124 comprises a battery. In another embodiment, power supply 124 comprises an energy harvester, energy scavenger or other similar power source. Available power, regardless of the source, is typically limited by size and weight restrictions imposed by applications requirements.

Figure 4:
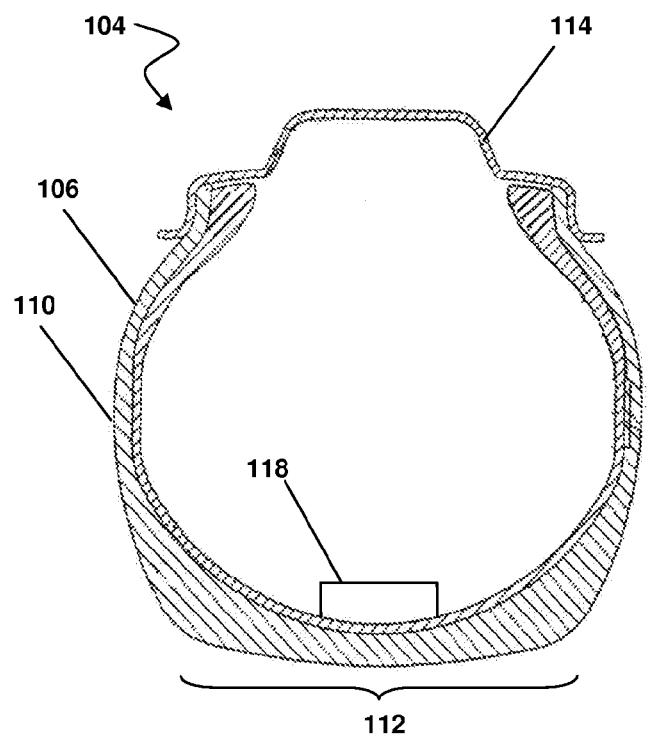
FIG. 4 is a cross-sectional side view of a wheel according to an embodiment.

According to one embodiment of the invention, wheel module 118 further comprises one or more sensors 126. In one embodiment, sensor 126 comprises an acceleration sensor, and wheel module 118 can be advantageously mounted to the inner tread region of tire 106, as depicted in FIG. 4. In another embodiment, a plurality of sensors 126 and/or multiple wheel modules 118 are mounted within tire 106.

Figure 5:
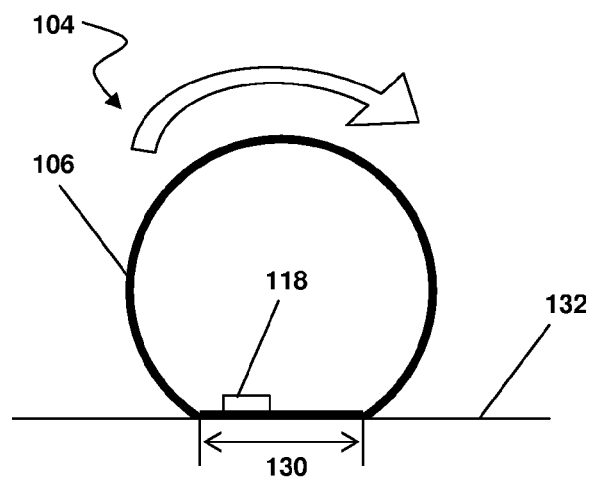
FIG. 5 is a diagram of a tire according to an embodiment.
Figure 6:
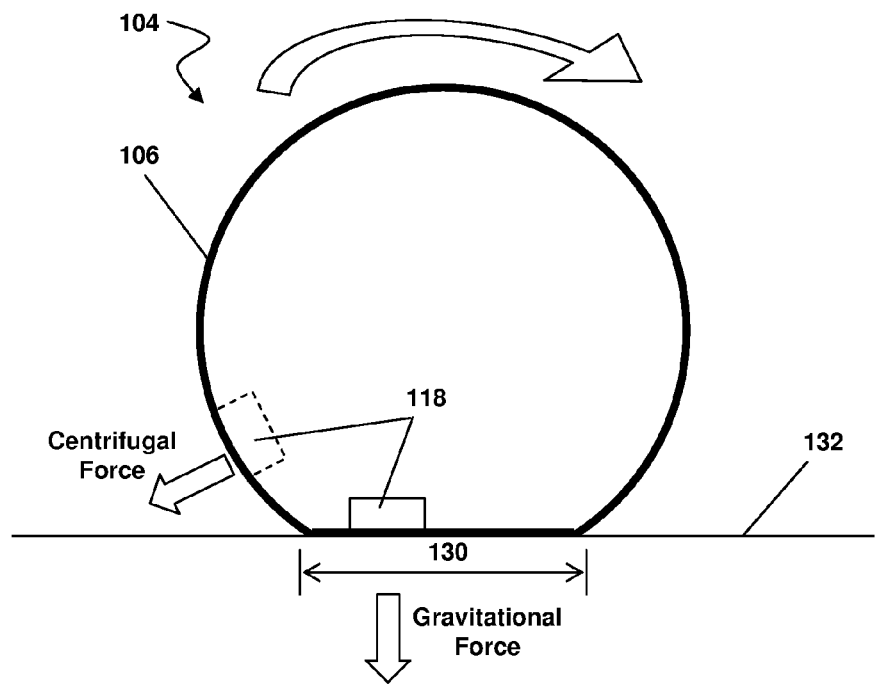
FIG. 6 is a diagram of a tire according to an embodiment.
Figure 7:
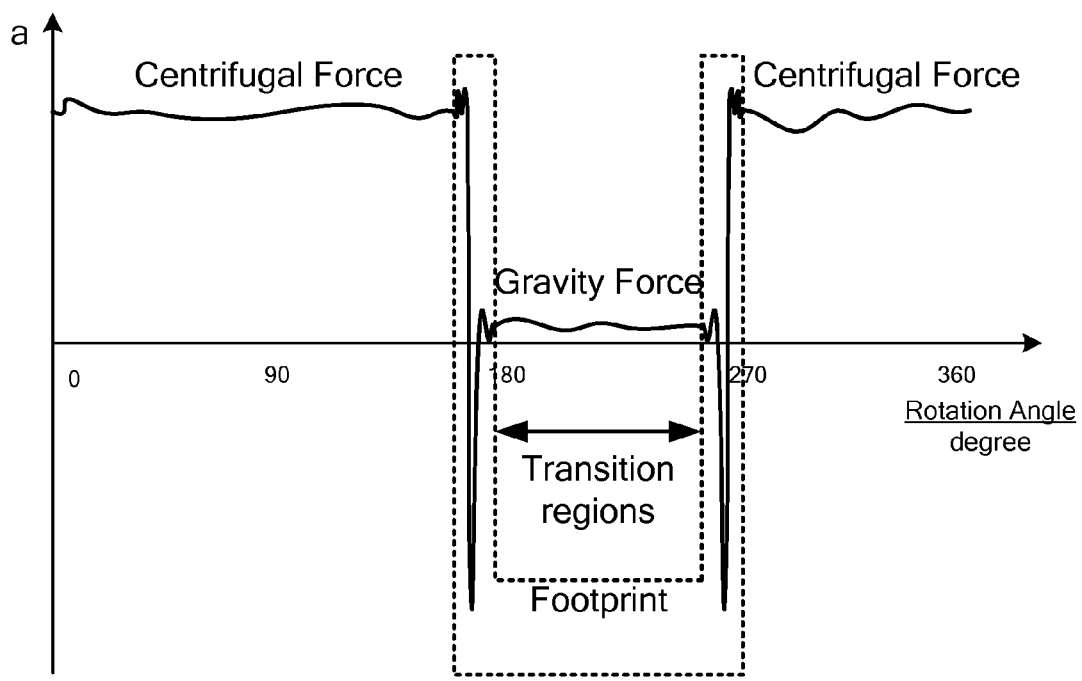
FIG. 7 is a graph according to an embodiment.

Referring to FIGS. 5-7, information sensed by sensor 126 can be used to determine the size of footprint area 130, where the size of footprint area 130 can be directly related to a load of vehicle 102, an inflation level of tire 106, and other factors useful for detecting and diagnosing the conditions and status of vehicle 102 and components thereof. In one embodiment, sensor 126 can sense different force effects when wheel module 118 is within footprint area 130 and when it is rotating outside of footprint area 130. In particular, when sensor 126 is rotating with tire 106 outside of footprint area 130, sensor 126 can sense a centrifugal force. When sensor 126 is within footprint area 130, sensor 126 does not move relative to a driving surface 132 and the forces acting on it are gravitational rather than centrifugal. Thus, the length, l, of footprint area 130 can be determined from measurement of the time sensor 126 experiences each state:

$$l = \frac{C * t_g}{t_g + t_c}$$

where C is the circumference of the tire, $t_g$ is the gravitational time and $t_c$ is the centrifugal time.

The aforementioned embodiment relies upon a high sampling frequency over the entire rotation of tire 106 in order to capture the times at which sensor 126 enters and exits footprint 130 with sufficient accuracy. This leads to a high current consumption of battery-powered module 118, which is generally undesirable.

Figure 8:
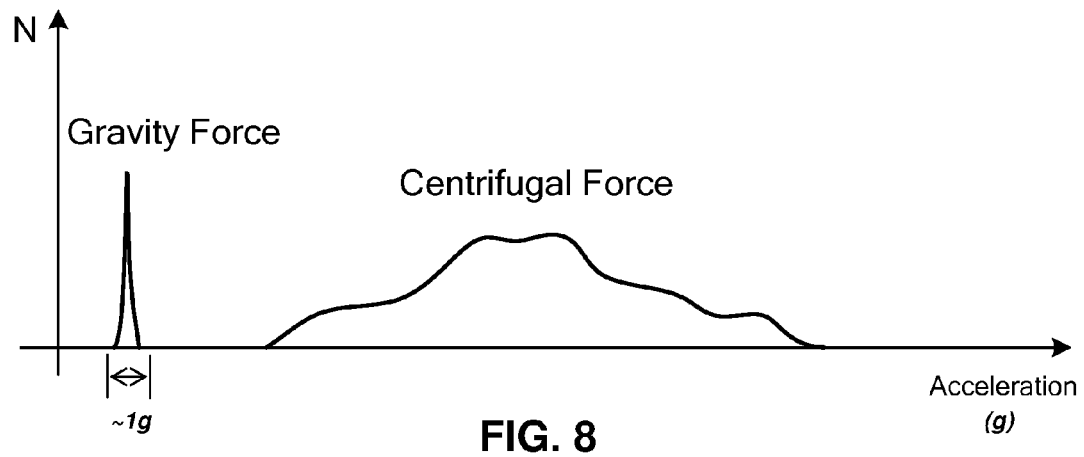
FIG. 8 is a graph according to an embodiment.

Various embodiments of the invention can reduce the sampling frequency, and therefore also the current consumption, by using a statistical approach. First, the sampling rate is assumed to be low, in the range of about one measurement taken per second or lower. This means that measurement and determination of footprint 130 is generally not possible in a single rotation of wheel 104. Further assuming that the angular position of a wheel of a vehicle in motion is random at the sampling points, the percentage of the samples at approximately one g of gravity then converges toward the percentage of the circumference of tire 106 that is in contact with driving surface 132, as can be seen in FIG. 8.

Figure 9:
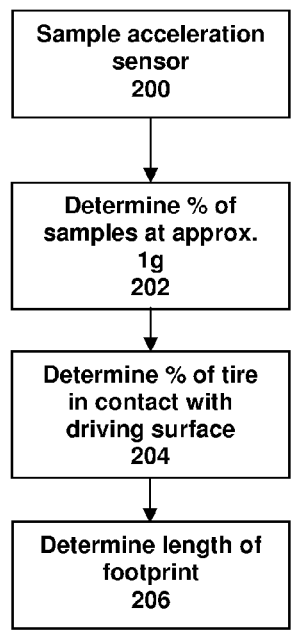
FIG. 9 is a flowchart according to an embodiment.

Referring to FIG. 9, one embodiment comprises periodically sampling sensor 126 at 200. At 202, a percentage of the samples at about one g is determined. From this percentage, the percentage circumferential portion of tire 106 in contact with driving surface 132 is determined at 204. Knowing the actual circumference of tire 106, the length of footprint 130 can then be determined at step 206. In one embodiment, these determinations, calculations and other operations can be carried out by control unit 128 or other circuitry within wheel module 118. In another embodiment, the determinations, calculations and other operations can be carried out by circuitry within or coupled to receiver unit 116, for example after samples and/or other data are communicated by module 118.

In various embodiments, options exist to avoid errors in the statistic that come from measurements during longer stopping periods, when the assumption that the measurement positions are random is no longer true. These periods include, for example, stops at traffic lights or in traffic jams, when no significant centrifugal force occurs even if sensor 126 is not within footprint 130.

In one embodiment, each acceleration measurement is transmitted from wheel module 118 to receiver unit 116, where the statistics are subsequently calculated. Receiver unit 116 can have access to vehicle speed information via a vehicle communication network or other system. Thus, all measurements at low speed can be excluded from the statistic.

In another embodiment, the statistics can be calculated within wheel module 116 and an RF signal transmitted if the convergence criterion is fulfilled. This methodology can further reduce the amount of data which must be transmitted. Because such transmissions are often the most power-consuming operation performed by wheel module 118, such an embodiment can significantly increase the life of power supply 124.

Figure 10:
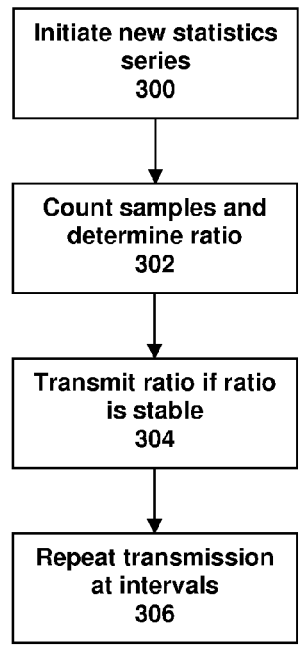
FIG. 10 is a flowchart according to an embodiment.

This embodiment is depicted in FIG. 10. At 300, a new statistics series is initiated if sensor 126 in tire 106 switches from parking mode to driving mode. At 302, the samples are counted and a ratio between samples in the gravity range and samples in the centrifugal force range is determined. After capturing an appropriate minimum number of samples, the resulting ratio is transmitted at 304 if a change in the ratio occurring from the last samples does not exceed a convergence threshold. The transmission can be repeated at defined intervals at step 306.

Various exception handling procedures can also be included in embodiments. If the number of consecutive samples which are in the gravity range exceeds a defined limit, this indicates that wheel 104 is likely not rotating. In this case, such samples can be excluded from the statistics. If the number of consecutive samples which are in the gravity range exceeds a second higher limit, this indicates that vehicle 102 is likely stopped for a longer period of time, and the load of vehicle 102 could be changed. In this case, such samples can be excluded from the statistics. If a change in the ratio exceeds the convergence threshold for a defined number of consecutive samples, this can be an indication that the load state has been changed, and the statistic can be reset. Optionally, the convergence threshold can be lowered, depending on the number of samples included in the statistics.

Figure 11:
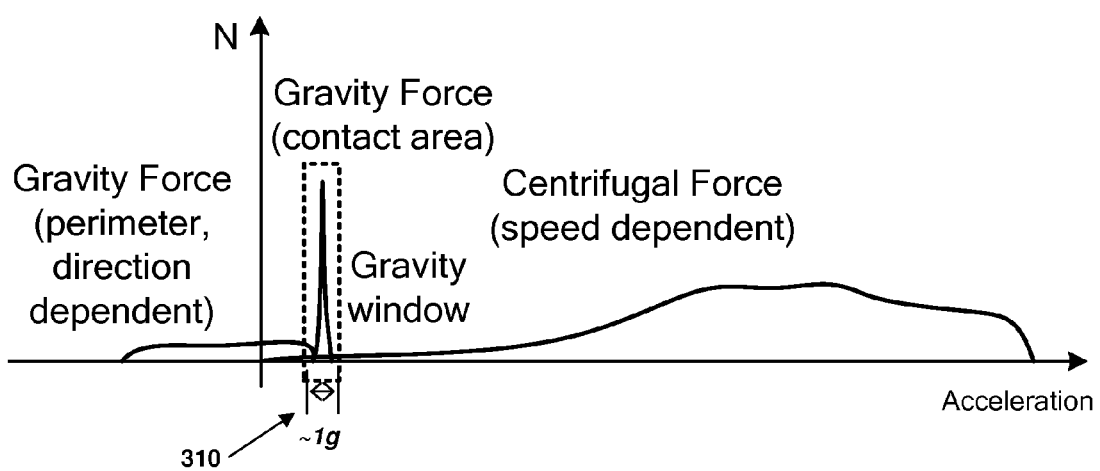
FIG. 11 is a graph according to an embodiment.

FIG. 11 depicts another embodiment, which provides for use of samples taken at very low speed, thereby achieving faster convergence. At low speeds, the centrifugal force acting on sensor 126 becomes negligible. Consequently, the acceleration measured during rotation is equivalent to the gravitational force. The acceleration sensed by sensor 126 on inner liner 108 depends on the angle between a sensitivity axis and gravitational forces. During rotation, the sensitivity axis rotates and the measured acceleration therefore changes between about +1 g, when sensor 126 is in footprint area 130, and about −1 g, when sensor 126 is at the top of tire 106 opposite footprint area 130. The samples that are assumed to be taken inside footprint area 130 can further be assumed to be in a narrow gravitational window 310 around +1 g, while all other samples above or below this window can be assumed to be taken during rotation, regardless of whether the change is caused by a changing measurement direction or by centrifugal force.

There are a small number of measurements that can be misinterpreted if the speed is low but results in a gravitational force measurement of between about 0 g and about 2 g. In these cases, there are positions during rotation of tire 106 at which the centrifugal force compensates the gravitational force, which has a negative sign with respect to the sensitivity direction of sensor 126, in particular an acceleration sensor. The number of such counts decreases if gravitational window 310 is narrowed; however the minimum width of gravitational window 310 depends on the accuracy, resolution and signal-to-noise ratio of sensor 126.

Embodiments of the invention thereby provide contactless measurement of the footprint area of a tire through in situ measurements by a sensor, such as an acceleration sensor. The systems and methods of the invention are energy efficient and cost-effective and can provide desired or required information regarding the status of a tire related to inflation/deflation, load, pressure and slip angle in various embodiments.

Although specific embodiments have been illustrated and described herein for purposes of description of an example embodiment, it will be appreciated by those of ordinary skill in the art that a wide variety of alternate and/or equivalent implementations calculated to achieve the same purposes may be substituted for the specific embodiments shown and described without departing from the scope of the present invention. Those skilled in the art will readily appreciate that the invention may be implemented in a very wide variety of embodiments. This application is intended to cover any adaptations or variations of the various embodiments discussed herein, including the disclosure information in the attached appendices. Therefore, it is manifestly intended that this invention be limited only by the claims and the equivalents thereof.

The invention claimed is:

1. A method comprising:
    sampling a sensor during rotation;
    determining a percentage of samples within a target range; and
    calculating a circumferential portion of the rotation associated with the percentage of samples.

2. The method of claim 1, wherein sampling a sensor further comprises sampling an acceleration sensor mounted to a tire during rotation of the tire.

3. The method of claim 2, wherein calculating a circumferential portion further comprises:
    determining a percentage circumferential portion of the tire in contact with a driving surface from the percentage of samples; and
    determining a length of a portion of the tire in contact with the driving surface.

4. The method of claim 2, wherein determining a percentage of samples within a target range further comprises:
    identifying samples taken when the sensor experiences a gravitational force; and
    identifying samples taken when the sensor experiences a centrifugal force.

5. The method of claim 4, wherein identifying samples taken when the sensor experiences a gravitational force further comprises identifying samples at about one g.

6. The method of claim 1, further comprising transmitting results of the sampling to a receiver.

7. The method of claim 6, further comprising excluding samples taken below a speed threshold.

8. The method of claim 1, further comprising transmitting data to a receiver if the percentage of samples within a target range is above a threshold.

9. The method of claim 8, wherein transmitting data further comprises transmitting a ratio of samples in a gravitational range to samples in a centrifugal range.

10. The method of claim 1, wherein sampling a sensor further comprises periodically sampling the sensor in a plurality of rotations.

11. The method of claim 1, wherein sampling a sensor further comprises randomly sampling the sensor in a plurality of rotations.

12. The method of claim 1, further comprising selecting a sampling rate based at least in part on a speed of rotation.

13. A system comprising:
    an acceleration sensor configured to sense samples in a first acceleration force range and a second acceleration force range; and
    circuitry configured to determine a percentage of the samples within the first acceleration force range.

14. The system of claim 13, wherein the first acceleration force range is a gravitational force range and the second acceleration force is a centrifugal force range.

15. The system of claim 14, wherein the sensor is mounted to a tire of a vehicle.

16. The system of claim 15, wherein the circuitry is further configured to determine a dimension of a tire footprint from the percentage of samples within the first acceleration force range.

17. The system of claim 16, wherein the dimension comprises a length.

18. The system of claim 15, wherein the samples are sensed during a plurality of revolutions of the tire.

19. The system of claim 18, wherein the samples are periodic samples.

20. The system of claim 18, wherein the samples are random samples.

21. The system of claim 18, wherein a sample rate is selected based at least in part on a speed of the vehicle.

22. The system of claim 13, wherein the first acceleration force range is about 0.5 g to about 1.5 g.

23. A method comprising:
    sampling an acceleration sensor at a plurality of speeds during a plurality of rotations of a tire;
    determining a percentage of samples that converges in a predetermined tolerance band; and
    calculating a circumferential portion of the tire associated with the percentage of samples, wherein the circumferential portion is related to a footprint dimension of the tire.

24. The method of claim 23, wherein determining a percentage of samples further comprises:
    identifying samples taken when the sensor experiences a gravitational force; and
    identifying samples taken when the sensor experiences a centrifugal force.

25. The method of claim 23, further comprising transmitting results of the sampling to a receiver.

* * * * *